United States Patent [19]

Sakai et al.

[11] 4,284,675

[45] Aug. 18, 1981

[54] CARRIERS FOR CATALYSTS

[75] Inventors: Toshiyuki Sakai, Funabashi; Koichi Matsuo, Tachikawa; Shozo Naito, Hino, all of Japan

[73] Assignee: Mitsui Mining & Smelting Co., Ltd., Tokyo, Japan

[21] Appl. No.: 155,034

[22] Filed: May 30, 1980

Related U.S. Application Data

[63] Continuation of Ser. No. 869,184, Jan. 12, 1978, abandoned.

[30] Foreign Application Priority Data

Jan. 26, 1977 [JP] Japan .................................. 52/6754
Jul. 8, 1977 [JP] Japan .................................. 52/81608

[51] Int. Cl.$^3$ .............................................. B32B 3/12
[52] U.S. Cl. .................................. 428/116; 252/463; 427/380; 428/446; 428/450; 428/454; 427/419.2; 427/419.3
[58] Field of Search ............... 428/116, 446, 450, 454; 427/380, 419 A, 419 B, 430 B; 252/466 PT, 477, 463

[56] References Cited

U.S. PATENT DOCUMENTS

| | | | |
|---|---|---|---|
| 3,554,929 | 1/1971 | Aarons | 252/466 B |
| 3,565,803 | 2/1971 | Keith et al. | 252/466 PT |
| 3,767,453 | 10/1973 | Hoekstra | 427/380 |
| 3,993,844 | 11/1976 | Kiger et al. | 428/446 |
| 4,066,801 | 1/1978 | Hoyer et al. | 427/380 |
| 4,218,341 | 8/1980 | LaKatos et al. | 252/463 |

*Primary Examiner*—Marion McCamish
*Assistant Examiner*—E. Rollins Buffalow
*Attorney, Agent, or Firm*—Jordan and Hamburg

[57] ABSTRACT

A carrier comprising a ceramic substrate, an active alumina coating formed thereon and at least one sinter inhibitor such as Mg dispersed in the active alumina-coated substrate, the carrier having excellent heat resistance and great thermal shock resistance and enabling a catalyst to be carried thereon to keep its catalytic activity substantially invariable even at high temperatures.

9 Claims, No Drawings

CARRIERS FOR CATALYSTS

This is a continuation of application Ser. No. 869,184, filed Jan. 12, 1978, now abandoned.

This invention relates to carriers for catalysts and more particularly to ceramic carriers which are excellent in heat resistance and thermal shock resistance without appreciably degrading a catalyst to be carried thereon in catalytic performances even at high temperatures.

Generally, ceramic carrier-supported catalysts are obtained by coating a high strength ceramic substrate such as cordierite, mullite or silicon nitride, with active alumina in the amounts of usually several % of the ceramic substrate and then having a catalyst carried on the thus-coated ceramic substrate. Various properties are required in the carriers for catalysts; carriers for supporting thereon catalysts to be used at high temperatures are required to have excellent heat resistance as one of the important requisites for carriers and, therefore, such heat resistant ceramic substrates should be those which are heat resistible to temperatures at which they are used. On the other hand, for example, carrier-supported catalysts for the purification of automobile exhaust gases may often be heated to not lower than 1200° C. in the presence of carbon monoxide (CO) and hydrocarbon (HC) each in a high concentration discharged depending on the conditions of driving automobiles and due to bad engine conditions and the like; in this case where the catalysts are heated to the high temperatures, the active alumina coating layer of the carrier will be sintered and recrystallized even if the substrate on which the coating layer is formed is sufficiently heat resistant, whereby the carrier remarkably decreases in specific surface area and degrades the catalyst in catalytic performance since the catalyst supported by the carrier diffuses through the active alumina coating layer thereof into the substrate particularly when the alumina coating is present in such a small amount as conventionally used.

The primary object of this invention is to provide a carrier for a catalyst, the carrier eliminating the aforesaid disadvantages and comprising a ceramic substrate, an active alumina coating formed thereon and a sinter inhibitor, in which (1) the active alumina coating is present in the amounts of 10–25% by weight of the ceramic substrate, (2) the water absorption is at least 12% by weight of the active alumina-coated substrate, and (3) at least one member selected from the group consisting of Mg, Al, Fe, Mo, W and Th and the compounds thereof, is contained in the amounts of at least 0.1% by weight, calculated as the metal, of the coated substrate (said at least one member being referred to as "sinter inhibitor" throughout the specification).

If the substrate of the carrier is such that the total volume of the pores thereof having a diameter of not larger than $2\mu$ is at least 50%, preferably at least 75% (these percentages being obtained by using a porosimeter), of the total volume of all the pores of the substrate, the resulting catalyst supported by the carrier will exhibit particularly slight degradation of catalytic activity even at high temperatures; thus, the carrier is a preferable one of this invention.

The reason for said formation of the active alumina coating on the substrate in the amounts of 10–25% by weight thereof is as follows. If the coating is formed in the amounts of less than 10% by weight, the catalyst supported on the carrier comprising such a coated substrate will diffuse through the coating into the substrate when used because of the insufficient amounts of the coating and the consequent insufficient capability of carrying the catalyst thereon, whereby the catalyst decreases in surface concentration and consequently catalytic activity. If the active alumina coating is formed in sufficient amounts, the resulting catalyst-on-carrier will securely be retained in a high concentration in the surface of the alumina coating thereby enabling the catalyst not only to retain its initial high catalytic performance but also to be prevented from diffusing into the substrate at high temperatures due to the presence of the compact active alumina coating, thus keeping its catalytic activity at a high level for a long service time. However, the use of the active alumina coating in the amounts exceeding 25% by weight of the substrate will not further improve the catalyst in catalytic activity and will, to the contrary, make the process for the preparation of the carrier complicated and also make the thermal shock resistance of the resulting carrier degraded. Therefore, the amount of active alumina coating used should be limited to 25% by weight at most.

The reason why the carrier of this invention should have a water absorption of at least 12% by weight thereof is that if the carrier were to have a water absorption of less than 12% by weight, then it will have too low porosity, unsatisfactory thermal shock resistance to sudden heating and cooling and a tendency of causing cracks therein. The water absorption referred to throughout the specification is one as determined by the measuring method prescribed in JIS (Japanese Industrial Standard) R 2205.

If the sinter inhibitor is substantially uniformly dispersed mainly in the active alumina coating on the substrate, then the use of at least 0.1% by weight of the inhibitor in terms of the metal content thereof on the basis of the weight of the active alumina-coated substrate will be effective, while the use of more than 2% by weight will not increasingly be effective as compared with the use of 2% by weight. As mentioned above, it is because a suitable amount of the active alumina coating has been formed on the substrate that the carrier of this invention has higher heat resistance than a conventional one. More particularly, the reason for this is considered that not only the formation of the active alumina coating on the substrate is effective in carrying the catalyst securely on the surface portion of the carrier thereby preventing the catalyst from diffusing into the inside of the carrier at high temperatures, but also the presence of fine particles of the sinter inhibitor in the particulate active alumina in the coating prevents the active alumina from being sintered and recrystallized.

A process for the preparation of the carrier of this invention will be illustrated hereinbelow.

A ceramic substrate for a carrier, such as cordierite, mullite or silicon nitride, is immersed under a reduced pressure in a liquid composition containing active alumina or a precursor thereof (the liquid composition being hereinafter referred to as "alumina sol"), for example, in an alumina sol as described in Japanese Patent Application No. 138896/74 (Japanese Patent Application Laying-Open Gazette No. 66294/76) entitled "Liquid Compositions."

The thus-immersed ceramic substrate was withdrawn from the alumina sol, freed from an excess of the sol attached thereto by being blown with air, dried at 100°-150° C. and then baked at 500°-900° C. for 1-5 hours. The thus-treated ceramic substrate was then subjected repeatedly to the same treatment to the extent that the resulting alumina-coated substrate has a water absorption of at least 12% by weight thereof and an active alumina coating content of 10-25% by weight of the original ceramic substrate. In order to have the alumina-coated substrate contain a sinter inhibitor, it is recommended to impregnate the alumina-coated substrate with an aqueous solution of a water soluble compound as the sinter inhibitor since this impregnating method is a simple one which may be used at a low cost in dispersing the sinter inhibitor substantially uniformly at every part of at least the active alumina coating. More specifically, the impregnating method comprises immersing the alumina-coated substrate in a solution containing a suitable amount of the sinter inhibitor, withdrawing the thus immersed substrate from the solution, blowing air against the immersed substrate to remove therefrom an excess of the solution attached thereto, drying the thus impregnated substrate at 100°-150° C. and then baking the dried, impregnated substrate at 500°-900° C. for 1-5 hours thereby obtaining a carrier of this invention.

Alternatively, said alumina sol may be incorporated with a suitable amount of the sinter inhibitor in solution or particulate form.

This invention will be better understood by the following Examples wherein all parts and percentages are by weight unless otherwise specified.

EXAMPLE 1

A commercially available cordierite honeycomb substrate (size, 76 mm $\phi \times 75$ mm long; water absorption, about 33%) was cut to obtain therefrom 18 test pieces each having a size of 20 mm long$\times$20 mm wide$\times$30 mm high. The test pieces so obtained were immersed in an alumina sol under a reduced pressure.

The alumina sol used herein was one which was prepared by slowly adding 15 parts of powdered alumina having a particle size of not larger than 325 mesh (average particle size: 30$\mu$), produced under the trademark of Alumina SC (boehmite) by Condie Petrochemie-Gesellschaft to 85 parts of an 0.4-N aqueous solution of acetic acid under vigorous agitation, continuing the agitation for 20 minutes after the end of addition of the boehmite to thoroughly mix the boehmite with the solution of acetic acid and curing the mixture in a thermostatic room at 25° C. to the extent that the particulate boehmite was not seen or identified with naked eyes (curing the mixture for about 42 hours in this case), thereby to obtain a colloidal alumina sol having a viscosity of 110 cps (this procedure being detailed in Japanese patent application No. 138896/74 or Japanese Patent Application Laying-Open Gazette No. 66294/76).

Said test pieces of the substrate withdrawn from the alumina sol were blown with air to remove therefrom an excess of the sol attached thereto, dried at 150° C. and baked at 700° C. for 3 hours. The same procedure was repeated as many times as required to obtain 1st to 6th groups consisting of 3 honeycomb substrate test pieces. The 1st to 6th grouped test pieces had active alumina coatings in the amounts of about 5, 10, 15, 20, 25 and 30% of the test pieces, respectively. These substrate test pieces were immersed in aqueous solutions containing magnesium chloride in suitably adjusted concentrations (magnesium chloride used, $MgCl_2.6H_2O$: concentrations, 579 g/l, 700 g/l, 840 g/l, 1050 g/l, 1400 g/l and 1867 g/l), respectively. The substrate test pieces withdrawn respectively from the solutions were each subjected to air blowing to remove therefrom an excess of the solution attached thereto, dried at 150° C. and then baked at 700° C. for 3 hours to contain therein about 2% of magnesium, calculated as the metal, thereby obtaining carrier test pieces. The carrier test pieces (containing the magnesium) were each impregnated with palladium (Pd) chloride using a hydrochloric acid-acidified aqueous solution of palladium chloride (the solution containing 3.4 g/l of Pd, calculated as the metal, and 13.6 g/l of azodicarbonamide) as the impregnating solution (such as impregnating solution being disclosed in Japanese Patent Application No. 9553/73 or Japanese Patent Application Laying-Open Gazette No. 97792/74 entitled "An impregnating solution for use in preparing catalysts for purifying gases"), immersed in a 3% aqueous solution of sodium formate at 60°-70° C. for 30 minutes to be subjected to wet-type reduction, washed with water, dried at 150° C. and then baked at 700° C. for 3 hours, thereby to obtain a carrier-supported catalyst (catalyst-on-carrier) containing 3 g/l of Pd, calculated as the metal, on the basis of the honeycomb carrier.

The catalysts-on-carrier so obtained were heat treated respectively at 700° C., 1000° C. and 1200° C. for 48 hours and then tested for their catalytic oxidation activity on carbon monoxide (CO) and hydrocarbons (HC) in terms of catalytic gas oxidation rate (%). The results are shown in Table 1. Said oxidation rates were measured under the following conditions:

| Composition of gas mixture to be tested: | CO 2.5-3.0% | by volume |
| --- | --- | --- |
| | HC 450-500 ppm | |
| | $O_2$ 5-6% | |
| Space velocity: | 30,000 hr$^{-1}$ | |

TABLE 1

| Example 1 Catalyst-on-carrier | Amount of active alumina coating (wt. %) | Amount of sinter inhibitor contained (wt. %, calculated as Mg) | Water absorption of carrier (after coated with active alumina) (wt. %) | Rate of catalytic gas oxidation with Pd catalyst-on-carrier (%) | | | | | |
| --- | --- | --- | --- | --- | --- | --- | --- | --- | --- |
| | | | | Baked at 700° C. | | Baked at 1000° C. | | Baked at 1200° C. | |
| | | | | CO | HC | CO | HC | CO | HC |
| Catalyst-on-1st group carrier | ca. 5 | 2.0 | ca. 29 | 99 | 93 | 98 | 81 | 98 | 74 |
| Catalyst-on-2nd group carrier | 10 | 2.0 | 24 | 99 | 96 | 99 | 88 | 99 | 81 |
| Catalyst-on-3rd group carrier | 15 | 2.0 | 20 | 99 | 97 | 99 | 89 | 99 | 83 |
| Catalyst-on-4th group carrier | 20 | 2.0 | 16 | 99 | 98 | 99 | 90 | 99 | 84 |
| Catalyst-on-5th group carrier | 25 | 2.0 | 12 | 99 | 97 | 99 | 90 | 99 | 85 |

TABLE 1-continued

| Example 1 Catalyst-on-carrier | Amount of active alumina coating (wt. %) | Amount of sinter inhibitor contained (wt. %, calculated as Mg) | Water absorption of carrier (after coated with active alumina) (wt. %) | Rate of catalytic gas oxidation with Pd catalyst-on-carrier (%) | | | | | |
|---|---|---|---|---|---|---|---|---|---|
| | | | | Baked at 700° C. | | Baked at 1000° C. | | Baked at 1200° C. | |
| | | | | CO | HC | CO | HC | CO | HC |
| Catalyst-on-6th group carrier | 30 | 2.0 | 9 | 99 | 97 | 99 | 90 | 99 | 84 |

EXAMPLE 2

There were provided 18 test pieces (20 mm long×20 mm wide×30 mm high) of cordierite honeycomb substrate, which were identical with those used in Example 1. The test pieces were each coated with active alumina in the amount of 20% by weight of the substrate and then divided into 6 (1st to 6th) groups each consisting of the 3 test pieces. Five (2nd to 6th) of the 6 groups so coated were immersed respectively in 5 aqueous solutions of magnesium chloride ($MgCl_2.6H_2O$ used; concentrations, 53 g/l, 263 g/l, 525 g/l, 1050 g/l and 1575 g/l) for impregnation and further treated in quite the same manner as in Example 1, thereby to obtain honeycomb carriers respectively containing 0, 0.1, 0.5, 1.0, 2.0 and 3.0% of Mg, calculated as the metal. The carriers so obtained were treated in quite the same manner as in Example 1 to obtain catalysts-on-carrier containing 3 g/l of Pd, calculated as the metal. The catalysts-on-carrier so obtained were tested for their catalytic oxidation activity on CO and HC in terms of catalytic gas oxidation rate, in the same manner as in Example 1. The results are shown in Table 2.

EXAMPLE 3

The procedure of Example 2 was followed except that the aqueous solutions of magnesium chloride were substituted by those of ferrous chloride, aluminum chloride, ammonium molybdate, ammonium tungstate and thorium nitrate to obtain carriers containing 2% of corresponding metals calculated as the metals, respectively, to obtain Pd catalysts-on-carrier Nos. 3-1 to 3-5 (Pd catalysts supported by the metal-containing carrier). The Pd catalysts-on-carrier so obtained were tested for their catalytic oxidation activity in terms of catalytic gas oxidation rate for CO and HC. The results are indicated in Table 3.

TABLE 3

| Example 3 Catalysts-on-carrier, respectively containing different sinter inhibitors | Amount of active alumina coating (wt. %) | Amount of sinter inhibitor contained (2 wt. %, calculated as metal) | Water absorption of carrier (after coated with active alumina) (wt. %) | Rate of catalytic gas oxidation with Pd catalyst-on-carrier (%) | | | | | |
|---|---|---|---|---|---|---|---|---|---|
| | | | | Baked at 700° C. | | Baked at 1000° C. | | Baked at 1200° C. | |
| | | | | CO | HC | CO | HC | CO | HC |
| 3-1 | ca. 20% | Aluminum chloride | ca. 16 | 99 | 97 | 99 | 87 | 99 | 81 |
| 3-2 | " | Ferrous chloride | " | 99 | 95 | 99 | 86 | 99 | 79 |
| 3-3 | " | Ammonium molybdate | " | 99 | 97 | 99 | 89 | 99 | 80 |
| 3-4 | " | Ammonium tungstate | " | 99 | 97 | 99 | 88 | 99 | 82 |
| 3-5 | " | Thorium nitrate | " | 99 | 97 | 99 | 88 | 99 | 81 |

EXAMPLE 4

Commercially available cordierite honeycomb substrates A', B' and C' (76 mm $\phi$×75 mm long) respectively having different water absorptions were each divided into halves (76 mm $\phi$×37 mm long).

The thus-halved substrates were coated with active alumina in the same manner as in Example 1 to the extent that the resulting coated substrates A-1, to A-4, B-1 to B-4, and C-1 to C-3 had their respective water absorptions as indicated in Table 4. The alumina-coated

TABLE 2

| Example 2 Catalyst-on-carrier | Amount of active alumina coating (wt. %) | Amount of sinter inhibitor contained (wt. %, calculated as Mg) | Water absorption of carrier (after coated with active alumina) (wt. %) | Rate of catalytic gas oxidation with Pd catalyst-on-carrier % | | | | | |
|---|---|---|---|---|---|---|---|---|---|
| | | | | Baked at 700° C. | | Baked at 1000° C. | | Baked at 1200° C. | |
| | | | | CO | HC | CO | HC | CO | HC |
| Catalyst-on-1st group carrier | ca. 20% | 0 | ca. 16 | 98 | 83 | 95 | 77 | 90 | 72 |
| Catalyst-on-2nd group carrier | " | 0.1 | " | 99 | 87 | 98 | 80 | 98 | 76 |
| Catalyst-on-3rd group carrier | " | 0.5 | " | 99 | 94 | 99 | 83 | 99 | 80 |
| Catalyst-on-4th group carrier | " | 1.0 | " | 99 | 97 | 99 | 88 | 99 | 82 |
| Catalyst-on-5th group carrier | " | 2.0 | " | 99 | 96 | 99 | 88 | 99 | 83 |
| Catalyst-on-6th group carrier | " | 3.0 | " | 99 | 96 | 99 | 87 | 99 | 82 | substrates so obtained were kept in a muffle furnace at 700° C. for 15 minutes, withdrawn therefrom to a room and allowed to cool for 15 minutes in the room, after which they were placed again in the furnace at 700° C.; this thermal cycle was repeated 5 times. The results are indicated in Table 4, from which it is seen that the coated substrates having a water absorption of at least 12% exhibited excellent thermal shock resistance.

TABLE 4

| Example 4 Coated substrate | Water absorption prior to formation of active alumina coating (wt. %) | Amount of active alumina coated (wt. %) | Water absorption subsequent to formation of active alumina coating (wt. %) | Result after thermal cycle test at 700° C. |
|---|---|---|---|---|
| A-1 | 33 | 10 | 25 | No change |
| A-2 | " | 20 | 16 | " |
| A-3 | " | 25 | 12 | " |
| A-4 | " | 30 | 9 | Cracks produced during 3rd cycle |
| B-1 | 26 | 11 | 19 | No change |
| B-2 | " | 14 | 15 | " |
| B-3 | " | 19 | 11 | Cracks produced during 4th cycle |
| B-4 | " | 23 | 9 | Cracks produced during 2nd cycle |
| C-1 | 20 | 10 | 13 | No change |
| C-2 | " | 14 | 10 | Cracks produced during 4th cycle |
| C-3 | " | 18 | 8 | Cracks produced during 2nd cycle |

EXAMPLE 5

Three test pieces 20 mm long × 20 mm wide × 30 mm high were obtained by cutting each of seven commercially available cordierite honeycomb substrates A to G respectively having the different porosity distributions as indicated in Table 5. Twenty-one (21) substrate test pieces so obtained were immersed in an alumina sol under a reduced pressure.

The substrate test pieces withdrawn from the alumina sol were freed from an excess of the sol carried thereon by blowing air thereto, dried at 150° C. and baked at 700° C. for 3 hours.

This procedure was repeated as many times as required to obtain honeycomb substrate test pieces on which an active alumina coating had been formed in the amounts of 18–19% of the substrate test piece. The coated substrates so obtained were each immersed in an aqueous solution of magnesium chloride (concentration: 1050 g of $MgCl_2 \cdot 6H_2O/l$), withdrawn from the solution, subjected to air blowing to remove an excess of the solution attached thereto, dried at 150° C. and baked at 700° C. for 3 hours thereby to have the coated substrates carry thereon about 2% of Mg, calculated as the metal thereby obtaining carriers. The carriers so obtained were each immersed in an aqueous impregnating solution of palladium chloride, the solution being acidified with hydrochloric acid and containing 3.4 g of Pd/l and 13.6 g of azodicarbonamide/l (such an impregnating solution being disclosed in Japanese patent application No. 9553/73 or Japanese Patent Application Laying-Open Gazette No. 97792/74), to be impregnated with the palladium chloride, thereafter immersed in a 3% aqueous solution of sodium formate at 60°–70° C. for 30 minutes to be subjected to wet-type reduction, washed with water, dried at 150° C. and then baked at 700° C. for 3 hours thereby to obtain three of each of honeycomb catalysts-on-carrier A to G containing 3 g of Pd/l as the metal. The catalysts-on-carrier so obtained were heat treated respectively at 700° C., 1000° C. and 1200° C. for 48 hours. The catalysts-on-carrier so heat treated were tested for their catalytic oxidation activity in terms of rate of oxidation of CO and HC. The results are shown in Table 6. The test conditions were as follows.

Composition of gas mixture used:

$$\left. \begin{array}{l} CO\ 2.5–3.0\% \\ HC\ 450–500\ ppm \\ O_2\ 5–6\% \end{array} \right\} \text{each by volume}$$

Space velocity 30,000 hr$^{-1}$

TABLE 5

| Kind of carrier for catalyst | Porosity distribution (vol. %) | | Amount of active alumina coated (wt. %) | Water absorption (wt. %) | |
|---|---|---|---|---|---|
| | Not larger than 2μ | Larger than 2μ | | Before coating active alumina | After coating active alumina |
| A | 99 | 1 | 18 | 32 | 16 |
| B | 85 | 15 | 19 | 34 | 17 |
| C | 75 | 25 | 19 | 32 | 16 |
| D | 53 | 47 | 19 | 30 | 15 |
| E | 40 | 60 | 18 | 28 | 15 |
| F | 16 | 84 | 18 | 30 | 15 |
| G | 4 | 96 | 19 | 32 | 16 |

TABLE 6

| Kind of catalyst-on-carrier | Rate of catalytic gas oxidation or gas conversion with Pd catalyst-on-carrier (%) | | | | | |
|---|---|---|---|---|---|---|
| | Heat treatment at 700° C. | | Heat treatment at 1000° C. | | Heat treatment at 1200° C. | |
| | CO | HC | CO | HC | CO | HC |
| A | 99 | 98 | 99 | 94 | 99 | 90 |
| B | 99 | 98 | 99 | 95 | 99 | 91 |
| C | 99 | 98 | 98 | 95 | 99 | 91 |
| D | 99 | 98 | 99 | 94 | 99 | 88 |
| E | 99 | 98 | 99 | 91 | 99 | 85 |
| F | 99 | 97 | 99 | 90 | 99 | 83 |
| G | 99 | 97 | 99 | 90 | 99 | 84 |

EXAMPLE 6

Carriers were prepared from the halves, 76 mm φ × 37 mm long, obtained by equally dividing commercially available cordierite honeycomb substrates C' and G', 76 mm φ × 75 mm long, were each coated with active alumina in the same manner as in Example 5 thereby to obtain alumina-coated honeycomb substrates C and G, the coated substrates respectively having the water absorptions as indicated in Table 7. The coated honeycomb substrates C and G so obtained were then kept in a muffle furnace at 700° C. for 15 minutes, thereafter withdrawn from the furnace and allowed to cool for 15 minutes. After the cooling, they were again placed in the furnace and this thermal cycle were repeated five times.

The results are shown in Table 7, from which it is seen that the coated substrates C and G which were different in porosity distribution from each other, are not remarkably different from each other particularly in thermal shock resistance and that the coated substrates having a water absorption of at least 12% were all excellent in thermal shock resistance.

TABLE 7

| Kind of alumina-coated substrate | Water absorption before coating active alumina (%) | Amount of active alumina coating (%) | Water absorption after coating active alumina (%) | Result of thermal cycle test at 700° C. |
| --- | --- | --- | --- | --- |
| C | 32 | 10 | 24 | No change |
| C | " | 19 | 15 | " |
| C | " | 24 | 12 | " |
| C | " | 28 | 9 | Cracks produced during 3rd cycle |
| G | 32 | 10 | 25 | No change |
| G | " | 20 | 15 | " |
| G | " | 24 | 12 | " |
| G | " | 28 | 10 | Cracks produced during 4th cycle |

What is claimed is:

1. A catalyst carrier comprising a ceramic substrate, an active alumina coating formed thereon and at least one sinter inhibitor contained in the active alumina coating in which:
   (1) the amount by weight of the active alumina coating is in the range of 10-25% by weight of the ceramic substrate,
   (2) the water absorption of the active alumina-coated ceramic substrate is at least 12% by weight thereof, and
   (3) at least one sinter inhibitor of 0.1-2.0% by weight calculated as metal and based on the coated ceramic substrate, selected from the group consisting of Mg, Al, and Th and compounds thereof, is dispersed in the active alumina coating.

2. The carrier according to claim 1, wherein the carrier is in honeycomb form.

3. The carrier according to claim 1, wherein the total volume of the pores having a diameter of not larger than $2\mu$ in the ceramic substrate is at least 50% of the total volume of all the pores present therein.

4. The carrier according to claim 1, wherein the carrier is in honeycomb form.

5. The carrier according to claim 1, wherein the upper limit on the amount of said sinter inhibitor is 2% by weight, calculated as metal and based on the coated ceramic substrate.

6. The catalyst carrier according to claim 1, wherein the sinter inhibitor is magnesium.

7. The catalyst carrier according to claim 1, wherein the sinter inhibitor is aluminum.

8. The catalyst according to claim 1, wherein the sinter inhibitor is thorium.

9. A catalyst carrier comprising a ceramic substrate, an active alumina coating formed thereon and at least one sinter inhibitor contained in the active alumina coating in which:
   (1) the amount by weight of the active alumina coating is in the range of 10-25% by weight of the ceramic substrate,
   (2) the water absorption of the active alumina-coated ceramic substrate is at least 12% by weight thereof, and
   (3) at least one sinter inhibitor in the amount of 0.1 to 2.0% by weight, calculated as metal and based on the coated ceramic substrate, selected from the group consisting of magnesium chloride, aluminum chloride and thorium nitrate, is dispended in the active alumina coating.

* * * * *